(12) United States Patent
Baker (10) Patent No.: US 9,106,985 B2
(45) Date of Patent: Aug. 11, 2015

(54) NETWORKING DEVICE PORT MULTIPLEXING

(71) Applicant: INTERNATIONAL BUSINESS MACHINES CORPORATION, Armonk, NY (US)

(72) Inventor: Anthony E. Baker, Stittsville (CA)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 13/745,822

(22) Filed: Jan. 20, 2013

(65) Prior Publication Data

US 2014/0204795 A1   Jul. 24, 2014

(51) Int. Cl.
*H04Q 11/04* (2006.01)

(52) U.S. Cl.
CPC ..... *H04Q 11/04* (2013.01); *H04Q 2213/13196* (2013.01); *H04Q 2213/13292* (2013.01); *H04Q 2213/13389* (2013.01)

(58) Field of Classification Search
None
See application file for complete search history.

(56) References Cited

U.S. PATENT DOCUMENTS

| | | | |
|---|---|---|---|
| 6,778,542 B1 * | 8/2004 | Hassan-Ali et al. | 370/401 |
| 7,363,417 B1 | 4/2008 | Ngai | |
| 2003/0026287 A1 | 2/2003 | Mullendore et al. | |
| 2008/0138075 A1 | 6/2008 | Gustlin et al. | |
| 2008/0159256 A1 * | 7/2008 | Faska et al. | 370/349 |
| 2008/0159277 A1 * | 7/2008 | Vobbilisetty et al. | 370/357 |
| 2009/0052345 A1 * | 2/2009 | Brown et al. | 370/254 |
| 2009/0052346 A1 * | 2/2009 | Brown et al. | 370/254 |
| 2010/0014858 A1 * | 1/2010 | Barbarossa et al. | 398/45 |
| 2010/0103939 A1 | 4/2010 | Carlson et al. | |
| 2010/0296559 A1 | 11/2010 | Barbieri et al. | |
| 2011/0058573 A1 | 3/2011 | Balakavi et al. | |
| 2011/0158658 A1 | 6/2011 | Myslinski et al. | |
| 2011/0188512 A1 | 8/2011 | Figueira et al. | |
| 2012/0039341 A1 | 2/2012 | Latif et al. | |
| 2012/0102239 A1 | 4/2012 | Huang | |
| 2014/0092912 A1 * | 4/2014 | Hathorn et al. | 370/401 |
| 2014/0269745 A1 * | 9/2014 | Johnson et al. | 370/401 |

FOREIGN PATENT DOCUMENTS

| | | |
|---|---|---|
| EP | 2 075 936 A2 | 7/2009 |
| EP | 2 222 033 A1 | 8/2010 |
| WO | 03/087984 A2 | 10/2003 |
| WO | 2010045904 A | 4/2010 |
| WO | 2010/056572 A1 | 5/2010 |

OTHER PUBLICATIONS

S. Kamiya et al., "Advanced FCoE—extension of fibre channel over Ethernet", Procs. of DC-CaVES, 2011.
R. Tabrorek, "10 Gigabit Ethernet Physical Layer," presentation at GEC 2000, year 2000.
"Quad Channel Universal 10G PHY with OTN/FEC and 1588v2/Y1731" Vitesse(R) product brief VSC8494, copyright 2011.

* cited by examiner

*Primary Examiner* — Hicham Foud
(74) *Attorney, Agent, or Firm* — Mark Vallone (57) ABSTRACT

A pair of ports of a first networking device operate up to a first throughput. An input port of a multiplexer connects to one of these ports, and the multiplexer also has a pair of output ports. An output port of another, second network device connects to one of the first networking device's and also to one of the multiplexer's output ports. These ports operate up to a second, greater throughput. An output port of yet another, third network device also connects to one of the multiplexer's output ports, and operates up to a third throughput no greater than the first throughput.

20 Claims, 3 Drawing Sheets

NETWORKING DEVICE PORT MULTIPLEXING

BACKGROUND

Networking speeds at which computing and other devices communicate with one another have continued to increase. Ten-megabit-per-second (mbps) speeds have given way to one-hundred-mbps speeds, and increasingly one-gigabit-per-second (gbps) and ten-gbps speeds are common on wired Ethernet interfaces. In turn, wired Ethernet interfaces have been supplanted and supplemented by fiber channel (FC) interfaces that can operate at eight-, sixteen-, and even higher gbps speeds.

SUMMARY

An example system of the disclosure includes a first networking device having a pair of ports operational up to a first throughput. The system includes a multiplexer having an input port connected to one of the pair of ports of the first networking device, and a pair of output ports. The system includes a second networking device having an output port connected to another one of the pair of ports of the first networking device and to one of the pair of output ports of the multiplexer, and operational up to a second throughput greater than the first throughput. The system includes a third networking device comprising an output port connected to another one of the pair of output ports of the multiplexer, and operational up to a third throughput no greater than the first throughput.

Another example system of the disclosure includes multiplexers to directly connect to a first networking device. The system includes a second networking device external to the multiplexers and to directly connect to both the first networking device and the multiplexers. The system includes third networking devices external to the multiplexers, to directly connect to the multiplexers, and to not directly connect to the first networking device. The first networking device includes ports operational up to a first throughput, the second networking device includes output ports operational up to a second throughput greater than the first throughput, and the third networking devices include output ports operational up to a third throughput no greater than the first throughput. The multiplexers are to multiplex each port of the first networking device to which the multiplexers are connected to the second networking device or to one of the third networking devices.

An example networking device of the disclosure includes multiplexers to directly connect to a different networking device. The networking device includes first output ports to directly connect to the different networking device and to directly connect to the multiplexers, and second output ports to directly connect to the multiplexers and to not directly connect to the different networking device. The different networking device includes ports operational up to a first throughput. The first output ports are operational up to a second throughput greater than the first throughput, and the second output ports are operational up to a third throughput no greater than the first throughput. The multiplexers are to multiplex each port of the first networking device to which the multiplexers are connected to one of the first output ports or to one of the second output ports.

An example method of the disclosure is performable in a system having a first networking device, a multiplexer, a second networking device, and a third networking device. The method includes the following to operate an output port of the second networking device at a first throughput greater than a throughput of each of a plurality of ports of the first networking device. A first port of the ports of the first networking device is multiplexed from the first networking device to the second networking device, using the multiplexer, such that an output port of the third networking device to which the multiplexer is connected is non-operational. The first port is bridged with a second port of the ports of the first networking device directly connected to the second networking device to operate the output port of the second networking device at the first throughput.

The method includes the following to operate the output port of the second networking device at a second throughput no greater than the throughput of each of the plurality of ports of the first networking device. The second port of the first networking device directly connected to the second networking device is used without bridging the second port with the first port of the first networking device, to operate the output port of the second networking device at the first throughput. The first port of the first networking device is multiplexed from the first networking device to the third networking device, using the multiplexer, such that the output port of the third networking device to which the multiplexer is connected is operational at up to the throughput of each of the plurality of ports of the first networking device.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

DETAILED DESCRIPTION

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

As noted in the background section, networking speeds have continued to increase. However, for legacy, cost and other reasons, networking administrators may encounter situations in which networking devices of different speeds have to be interconnected with one another. For example, a wired Ethernet switch may have eight ten-gigabit-per-second (gbps) ports, and the devices that are to connect to this Ethernet switch may include devices also having ten-gbps wired Ethernet ports, devices having eight-gbps fiber channel (FC) ports, and devices having sixteen-gbps FC ports. As such, an Ethernet-to-FC device may be employed so that the devices having the FC ports can be connected to the wired Ethernet ports of the Ethernet switch.

It may not be known a priori whether the Ethernet-to-FC device will connect sixteen-gbps FC devices, eight-gbps FC devices, or ten-gbps wired Ethernet devices, however. To ensure that the sixteen-gbps FC devices are able to communicate at their rated throughput, the Ethernet-to-FC device may have four output ports that each bridges two of the ten gbps ports of the wired Ethernet switch. Therefore, if a sixteen-gbps FC device is connected to an output port, this device is able to communicate at its rated maximum throughput. However, if an eight-gbps FC device or a ten gbps wired Ethernet device is instead connected to an output port, the bandwidth provided by bridging two of the ten-gbps ports of the wired Ethernet switch is effectively wasted.

Techniques disclosed herein overcome this problem. In the above example, four multiplexers are connected between four of the ports of the wired Ethernet switch and the Ethernet-to-FC device. The other four ports of the wired Ethernet switch are connected directly to the Ethernet-to-FC device. If an output port of the Ethernet-to-FC device is connected to a sixteen-gbps FC device, then one of the multiplexers multiplexes its wired Ethernet switch port to the Ethernet-to-FC device. The Ethernet-to-FC device bridges this multiplexed port with one of the directly connected Ethernet switch ports to provide the sixteen-gbps FC device its full maximum throughput.

However, if an output port of the Ethernet-to-FC device is not used, or is connected to an eight-gbps FC device or a ten-gbps wired Ethernet device, then the multiplexer does not multiplex its wired Ethernet switch port to the Ethernet-to-FC device for bridging purposes. This wired Ethernet switch port can instead be connected via the multiplexer to another eight-gbps FC device or ten-gbps wired Ethernet device. As such, bridging two wired Ethernet switch ports is achieved just when necessary to provide a throughput greater than the throughput of any individual wired Ethernet switch port. The bandwidth provided by the wired Ethernet switch is not wasted, and is maximally usable.

Figure 1:
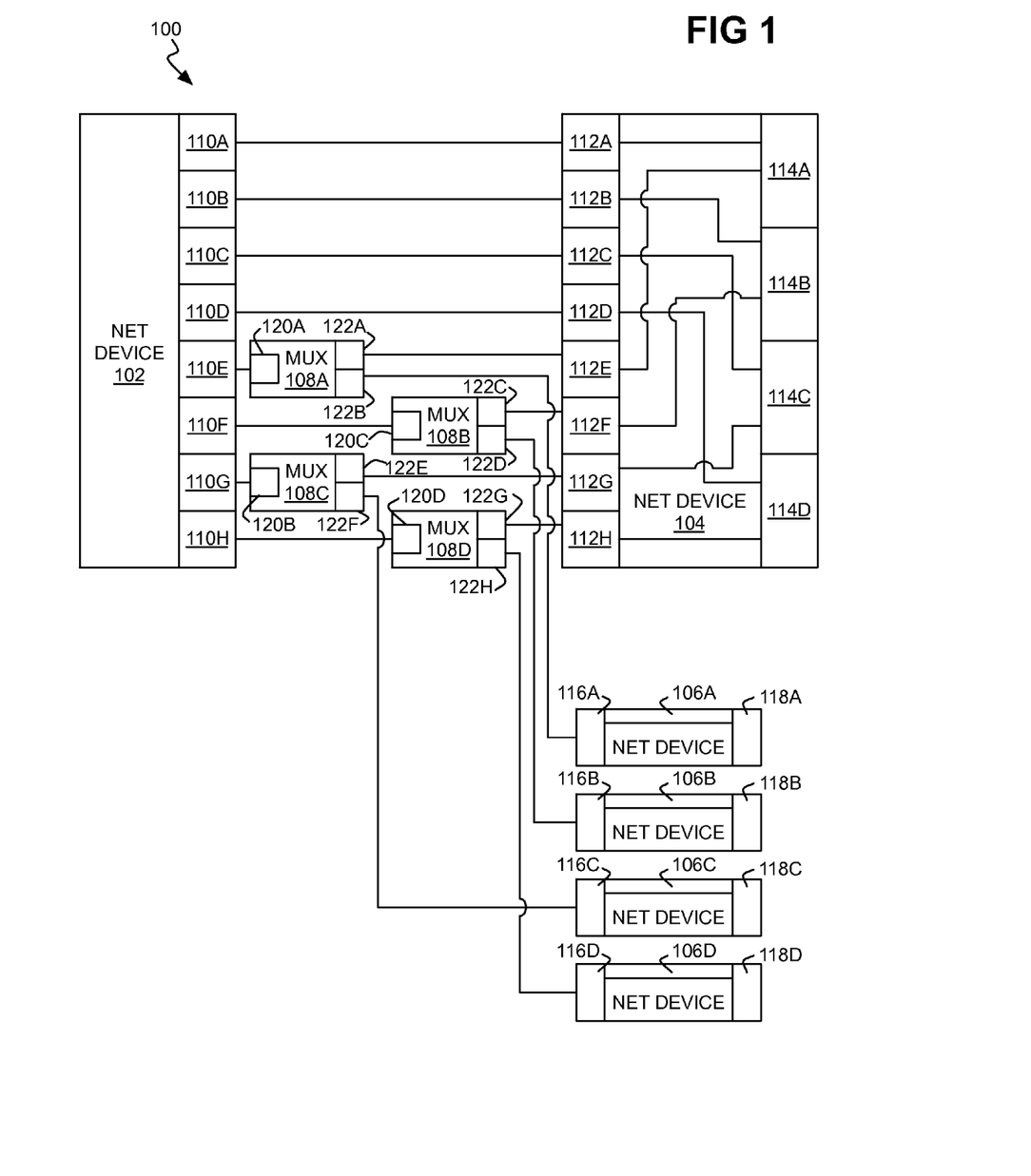
FIG. 1 is a diagram of an example system in which networking device ports are multiplexed.

FIG. 1 shows an example system 100. The system 100 includes networking devices 102, 104, and 106A, 106B, 106C, and 106D, the latter four of which are collectively referred to as the networking devices 106. The system 100 also includes multiplexers 108A, 108B, 108C, and 108D, which are collectively referred as to the multiplexers 108. More generally, there are one or more networking devices 106, and one or more multiplexers 108. It is noted that the description herein is primarily made with respect to transmission paths from the networking device 102 to the networking devices 104 and 106, but applies equally to transmission paths from the networking devices 104 and 106 to the networking device 102.

The networking device 102 may be a wired Ethernet switch, and includes eights ports 110A, 110B, 110C, 110D, 110E, 110F, 110G, and 110H, which are collectively referred to as the ports 110. More generally, there are at least two ports 110. Each port 110 is operational up to a first throughput. For example, each port 110 may be a wired Ethernet port that is able to support ten gbps. It is noted that usage of the terminology port is used herein synonymously with the term interface.

The networking device 104 may be an Ethernet-to-FC device, such as an Ethernet-to-FC bridge device. The networking device 104 may be a physical networking layer (PHY) device, or another type of networking device. The networking device 104 includes eight input ports 112A, 112B, 112C, 112D, 112E, 112F, 112G, and 112H, which are collectively referred to as the input ports 112. More generally, there are at least two input ports 112. The input ports 112 can be the same type of port as the ports 110 of the networking device 102, such as ten-gbps wired Ethernet ports.

The networking device 104 includes four output ports 114A, 114B, 114C, and 114D, which are collectively referred to as the output ports 114. More generally, there is at least one output port 114. Each output port 114 is operational up to a second throughput greater than the first throughput at which the ports 110 of the networking device 102 can maximally operate. For example, each output port 114 may be able to support a ten-gbps wired Ethernet port, an eight-gbps FC port, or a sixteen-gbps FC port.

The networking devices 106 may be PHY devices, retiming devices, or other types of networking devices. The four networking devices 106 include four input ports 116A, 116B, 116C, and 116D, respectively, which are collectively referred to as the input ports 116. In general, each networking device 106 has at least one input port 116. The input ports 116 can be the same type of port as the ports 110 of the networking device 102, such as ten-gbps wired Ethernet ports.

The four networking devices 106 include four output ports 118A, 118B, 118C, and 118D, respectively, which are collectively referred to as the output ports 118. In general, each networking device 106 has at least one output port 118. Each output port 118 is operational up to a third throughput no greater than the first throughput at which the ports 110 of the networking device 102 can maximally operate. For example, each output port 118 may be the same type of port as the ports 110 of the networking device 102, such as ten-gbps wired Ethernet ports.

The four multiplexers 108 include four input ports 120A, 120B, 120C, and 120D, respectively, which are collectively referred to as the input ports 120. The four multiplexers 108 include eight output ports 122A and 122B, 122C and 122D, 122E and 122F, and 122G and 122H, respectively, which are collectively referred to as the output ports 122. In general, each multiplexer 108 has at least one input port 120 and at least two output ports 122. The input ports 120 and the output ports 122 can be the same type of port as the ports 110 of the networking device 102, such as ten-gbps wired Ethernet ports.

Four ports 110A, 110B, 110C, and 110D of the networking device 102 are directly connected to four input ports 112A, 112B, 112C, and 112D, respectively, of the networking device 104. The other four ports 110E, 110F, 110G, and 110H of the networking device 102 are directly connected to the four input ports 120, respectively, of the multiplexers 108. Four output ports 122A, 122C, 122E, and 122G of the multiplexers 108 are directly connected to the other four input ports 112E, 112F, 112G, and 112H, respectively, of the networking device 104. The other four output ports 122B, 122D, 122F, and 122H of the multiplexers 108 are directly connected to the four input ports 116, respectively, of the networking devices 106.

As noted, the four input ports 112A, 112B, 112C, and 112D of the networking device 104 are directly connected to the four ports 110A, 110B, 110C, and 110D, respectively, of the networking device 102. By comparison, the other input ports 112E, 112F, 112G, and 112H of the networking device 104 are indirectly connected to the other four ports 110E, 110F, 110G, and 110H, respectively, of the networking device 102, via the multiplexers 108. Similarly, the four input ports 116 of the networking device 106 are indirectly connected to the same four ports 110E, 110F, 110G, and 110H, respectively, of the networking device 102, via the multiplexers 108.

Within the networking device 104, the input ports 112A and 112E are connected to the output port 114A. Specifically, just the input port 112A can be connected to the output port 114A, or the input ports 112A and 112E can be bridged together and connected to the output port 114A. Each other output port 114 is connected in this same manner to two input ports 112 within the networking device 104. The output port 114B is connected to the input ports 112B and 112F, the output port 114C is connected to the input ports 112C and 112G, and the output port 114D is connected to the input ports 112D and 112H.

By comparison, within each networking device 106, each output port 118 is connected to one corresponding input port 116. Specifically, the output port 118A of the networking device 106A is connected to the input port 116A of the networking device 106A. The output port 118B of the networking device 106B is connected to the input port 116B of the networking device 106B, and the output port 118C of the networking device 106C is connected to the input port 116C of the networking device 106C. The output port 118D of the networking device 106D is connected to the input port 116D of the networking device 106D.

The example system 100 works as follows. If an output port 114 of the networking device 104 has to operate at a throughput greater than the first throughput of each port 110 of the networking device 102, then two ports 110 are bridged together within the networking device 104 to provide the desired throughput. One of these two ports 110 is directly connected to the networking device 104, whereas the other of these two ports 110 is indirectly connected to the networking device 104 via a multiplexer 108 multiplexing the port 110 in question to the networking device 104.

For example, if the output port 114A of the networking device 104 has to operate at a throughput greater than the first throughput of the each port 110 of the networking device 102, then the ports 110A and 110E are bridged together within the networking device 104 to provide the desired throughput. The port 110A is directly connected to the networking device 104. The port 110E is indirectly connected to the networking device 104 via the multiplexer 108A multiplexing the port 110E to the networking device 104.

The above-described operation is referred as a bridging operational mode of the output port 114A. Each output port 114 is able to operate in the bridging operational mode irrespective of whether any other output port 114 is operating in this mode. When an output port 114 is operating in the bridging operational mode, however, the output port 118 of one of the networking devices 106 is non-operational. This is because the networking device 106 in question is not connected to any port 110 of the networking device 102, because a multiplexer 108 has multiplexed the port 110 that would otherwise be connected to this networking device 106 to the networking device 104 instead.

In the above example, the multiplexer 108A has multiplexed the port 110E of the networking device 102 to the networking device 104. The multiplexer 108A is able to multiplex the port 110E to either the networking device 104 or the networking device 106A. Therefore, because the port 110E has been multiplexed to the networking device 104, the port 110E is not multiplexed to the networking device 106A. The output port 118A of the networking device 106A is thus non-operational, because the networking device 106A is not connected to the networking device 102.

Each output port 114 of the networking device 104 is also able to operate in a non-bridging operational mode, again irrespective of whether any other output port 114 is operating in this mode. This operational mode works as follows. If an output port 114 just has to operate at a throughput no greater than the first throughput of each port 110 of the networking device 102, then two ports 110 are not bridged together within the networking device 104. Rather, just one port 110 is used to provide this desired throughput, specifically the port 110 that is directly connected to the networking device 104.

For example, the output port 114A of the networking device 104 may have to operate just at a throughput no greater than the first throughput of each port 110 of the networking device 102. Therefore, the ports 110A and 110E do not have to be bridged together within the networking device 104. Rather, just the port 110A directly connected to the networking device 104 is used to provide this throughput.

When an output port 114 is operating in the non-bridging operational mode, the output port 118 of one of the networking devices 106 becomes operational. This is because the networking device 106 in question can be connected to a port 110 of the networking device 102, since the port 110 is not needed to provide the desired throughput at the output port 114 in question of the networking device 104. As such, the multiplexer 108 multiplexes the port 110 in question to this networking device 106, instead of to the networking device 104.

In the above example, the multiplexer 108A multiplexes the port 110E of the networking device 102 to the networking device 106A. The output port 118A of the networking device 106A is thus operational, because the networking device 106A is connected to the networking device 102. The output port 118A can provide a throughput no greater than the first throughput of the port 110E itself.

Switching an output port 114 of the networking device 104 between the bridging operational mode and the non-bridging operational mode can be achieved in a number of different ways. The networking device 104 may have built-in logic to provide this switching capability. The logic may detect whether a device has been connected to an output port 114 that can support a greater throughput than any one port 110 of the networking device 102 can provide. If so, then the output port 114 may be configured to bridge together two ports 110 as described, and if not, then the output port 114 may be configured to use the port 110 to which the networking device 104 is directly connected.

Switching an output port 114 between the two operational modes can also be specified via user configuration, such that a given output port 114 is specified by the user to operate in a particular operational mode regardless of whether a device is connected to the output port 114 and regardless of the type of device that is connected to the output port 114. Switching an output port 114 can be achieved by a management component as well. The management component may be software, hardware, or a combination of software and hardware that encodes desired logic, and which can be internal or external to the networking device 104.

In cooperation with an output port 114 operating in a particular operational mode, a corresponding multiplexer 108 may have to appropriately multiplex a port 110 of the networking device 102 to the networking device 104. Specifically, when an output port 114 is operating in the bridging operational mode, the corresponding multiplexer 108 has to multiplex a port 110 of the networking device 102 that the networking device 104 bridges with one of the directly connected ports 110. When an output port 114 is operating in the non-bridging operational mode, from the perspective of the networking device 104 it does not matter whether the multiplexer 108 has multiplexed a port 110 of the networking device 102 to the networking device 104 or not. However, by default, it can be desirable for this multiplexer 108 to multiplex the port 110 in question to one of the networking devices 106, so that this networking device 106 can take advantage of the bandwidth afforded by the port 110 and can be operational.

The multiplexers 108 can have their multiplexing functionality controlled to select whether the ports 110 are (independently) multiplexed to the networking device 104 or to the networking devices 106 in a number of different ways. For example, the networking device 104 may be communicatively connected to a select line of each multiplexer 108, and assert (or not assert) the select line when the networking device 104 needs to bridge the port 110 to which the multiplexer 108 in question is connected. As a second example, a user may manually configure each multiplexer 108, independently of configuration of the operational mode in which each output port 114 of the networking device 104 is to operate. As a third example, the management component may appropriately configure the multiplexers 108 in accordance its configuration of the output ports 114 of the networking device 104, depending on which (if any) output ports 114 are operating in the bridging operational mode.

Figure 2:
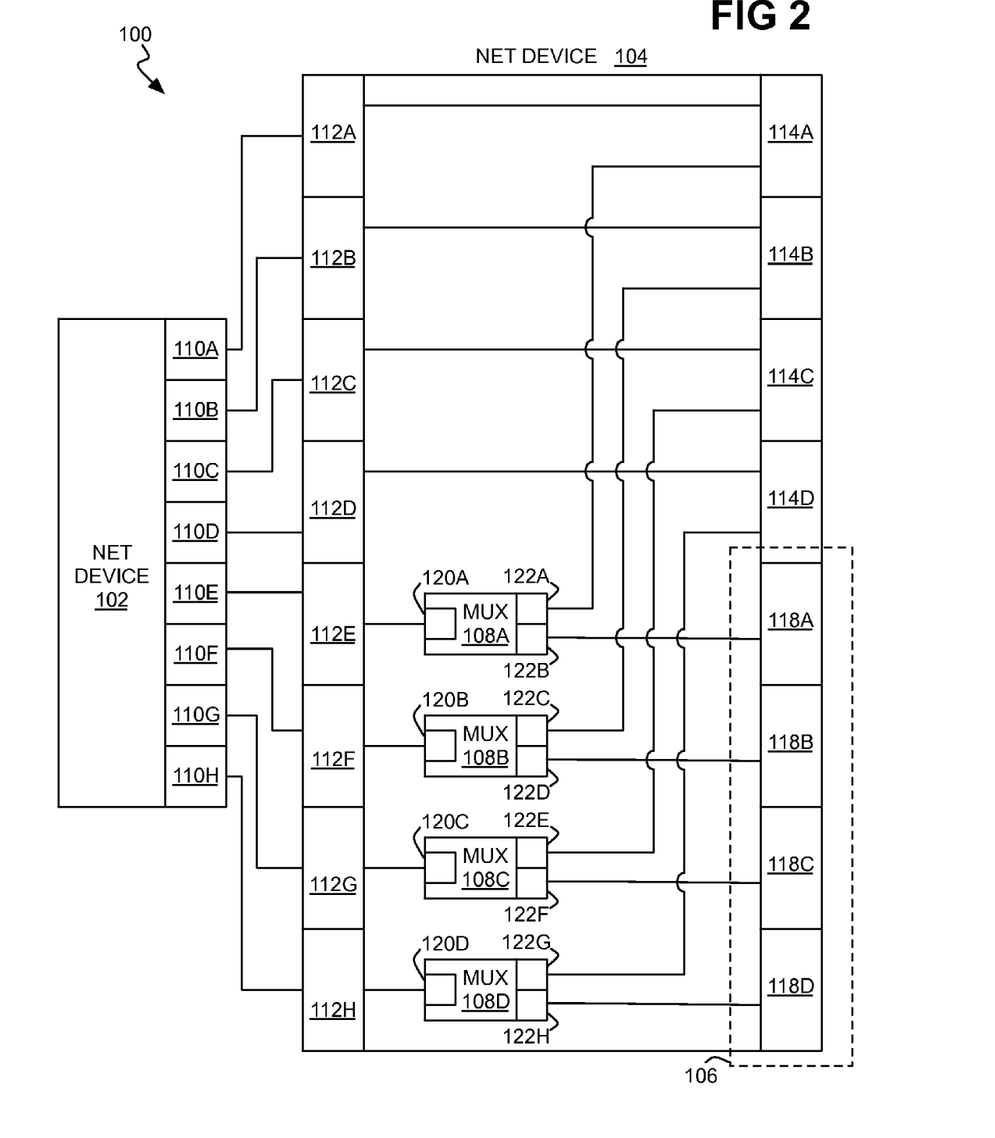
FIG. 2 is a diagram of another example system in which networking device ports are multiplexed.

FIG. 2 shows another example system 100. In the system 100 of FIG. 2, the multiplexers 108 are internal to the networking device 104, as opposed to being external to the networking device 104 as in FIG. 1. In one implementation, the multiplexers 108 may be implemented in FIG. 2 as part of the same discrete integrated circuit (IC) within which the logic of the networking device 104, if any, is implemented.

Furthermore, in FIG. 2 the networking devices 106 are effectively internalized within the networking device 104, and thus are represented by dotted lines in FIG. 2, as opposed to being external to the networking device 104 as in FIG. 1. Specifically, the output ports 118 are part of the networking device 104 in the system 100 of FIG. 2, and the input ports 116 may not be present. Otherwise, though, the system 100 operates in FIG. 2 in the same manner as the system 100 does in FIG. 1.

Figure 3:
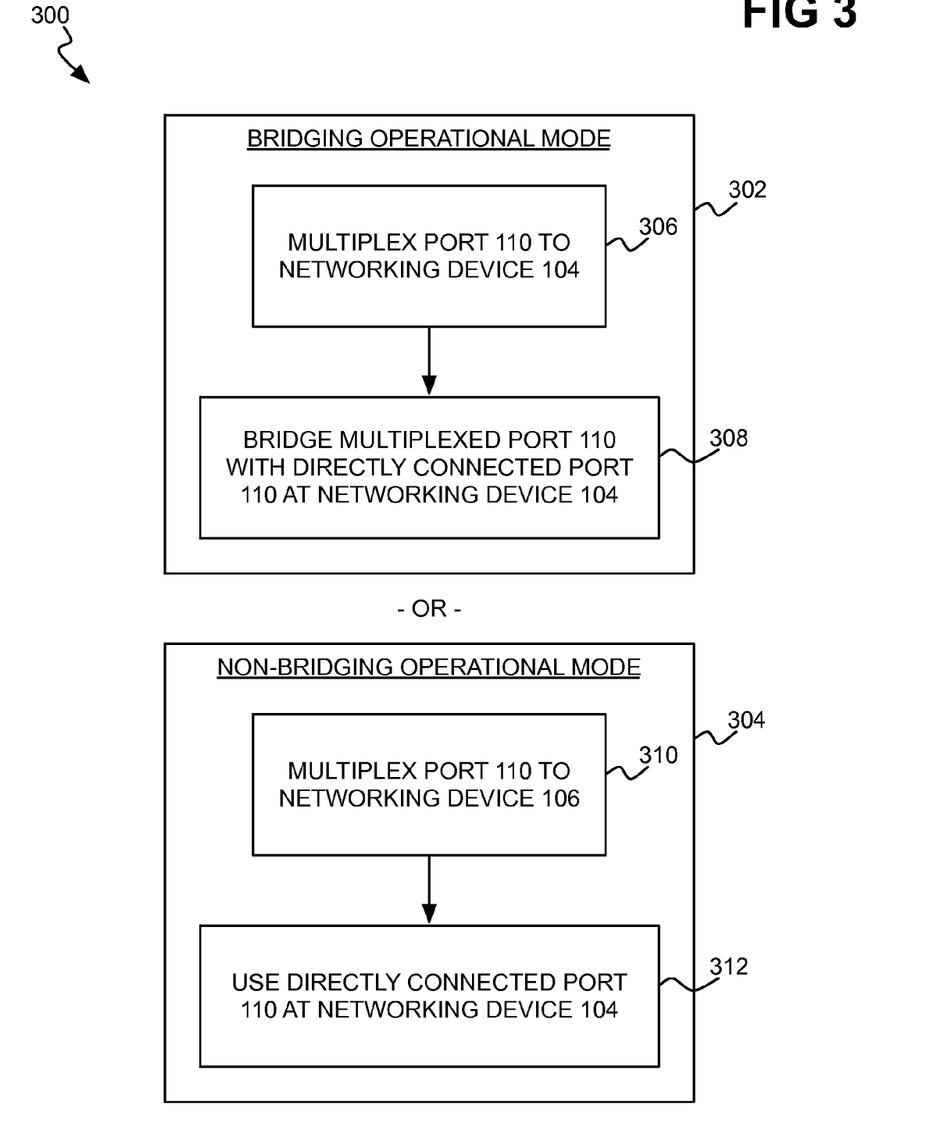
FIG. 3 is a flowchart of an example method for operating a system in which networking device ports are multiplexed.

In conclusion, FIG. 3 shows an example method 300 that summarizes example operation of the system 100 of both FIGS. 1 and 2. The method 300 is performed for an output port 114 of the networking device 104. Part 302 is performed to operate this output port 114 in the bridging operational mode, at a throughput greater than the throughput of the ports 110 of the networking device 102. Part 304 is performed to operate the output port 114 in the non-bridging operational mode, at a throughput no greater than the throughput of the ports 110 of the networking device 102.

In part 302, a multiplexer 108 is used to multiplex a port 110 of the networking device 102 to the networking device 104 (306). This multiplexed port 110 is bridged at the networking device 104 with a port 110 of the networking device 102 to which the networking device 104 is directly connected (308). As such, the output port 114 can operate at a throughput greater than the throughput of either of these ports 110. However, the output port 118 of the networking device 106 to which the multiplexer 108 can also multiplex a port 110 becomes non-operational.

In part 304, the multiplexer 108 is used to multiplex the port 110 of the networking device 102 to the networking device 106 instead (310). The port 110 of the networking device 102 to which the networking device 104 is directly connected is thus used by itself at the networking device 104, without being bridged to any other port 110 (312). As such, the output port 114 of the networking device 104 can operate at a throughput no greater than the throughput of the directly connected port 110. However, the output port 118 of the networking device 106 is now operational, and can also operate at a throughput no greater than the throughput of the multiplexed port 110.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

I claim:

1. A system comprising:
a first networking device comprising a pair of ports operational up to a first throughput;
a multiplexer comprising an input port connected to one of the pair of ports of the first networking device, and a pair of output ports;
a second networking device comprising an output port connected to another one of the pair of ports of the first networking device and to one of the pair of output ports of the multiplexer, and operational up to a second throughput greater than the first throughput; and
a third networking device comprising an output port connected to another one of the pair of output ports of the multiplexer, and operational up to a third throughput no greater than the first throughput.

2. The system of claim 1, wherein in a first operational mode, the output port of the second networking device is configured to operate at greater than the first throughput, and the multiplexer is configured to multiplex the first networking device to the second networking device.

3. The system of claim 2, wherein in the first operational mode, the multiplexer is configured to not multiplex the first networking device to the third networking device.

4. The system of claim 2, wherein in the first operational mode, the second networking device bridges the pair of ports of the first networking device to operate the output port of the second networking device at greater than the first throughput.

5. The system of claim 2, wherein in the first operational mode, the third networking device is not connected to the first networking device, such that the output port of the third networking device is non-operational.

6. The system of claim 1, wherein in a second operational mode, the output port of the second networking device is configured to operate at no greater than the first throughput, and the multiplexer is configured to multiplex the first networking device to the third networking device.

7. The system of claim 6, wherein in the second operational mode, the multiplexer is configured to not multiplex the first networking device to the second networking device.

8. The system of claim 6, wherein in the second operational mode, the second networking device does not bridge the pair of ports of the first networking device to operate the output port of the second networking device at no greater than the first throughput.

9. The system of claim 6, wherein in the second operational mode, the third networking device is connected to the first networking device, such that the output port of the third networking device is operational at up to the first throughput.

10. The system of claim 1, wherein the multiplexer is one of external to the second networking device and internal to the second networking device, and wherein the third networking devices are one of external to the second networking device and internal to the second networking device.

11. The system of claim 1, wherein the ports of the first networking device are wired Ethernet ports, the output port of the second networking device is a fiber channel or Ethernet port, and the output port of the third networking device is a wired Ethernet port.

12. A system comprising:
a plurality of multiplexers to directly connect to a first networking device;

a second networking device external to the multiplexers and to directly connect to both the first networking device and the multiplexers;

a plurality of third networking devices external to the multiplexers, to directly connect to the multiplexers, and to not directly connect to the first networking device, wherein the first networking device comprises a plurality of ports operational up to a first throughput, the second networking device comprises a plurality of output ports operational up to a second throughput greater than the first throughput, and the third networking devices comprise a plurality of output ports operational up to a third throughput no greater than the first throughput, and wherein the multiplexers are to multiplex each port of the first networking device to which the multiplexers are connected to the second networking device or to one of the third networking devices.

13. The system of claim 12, wherein in a bridging mode of a given output port of the ports of the second networking device, the given output port is configured to operate at greater than the first throughput, the multiplexers are configured to multiplex a given port of the ports of the first networking device to the second networking device and not to a given third networking device of the third networking devices, the second networking device is to bridge the given port and another port of the first networking device to operate the given output port at greater than the first throughput, and the output port of the given third networking device is non-operational.

14. The system of claim 12, wherein in a non-bridging mode of a given output port of the ports of the second networking device, the given output port is configured to operate at no greater than the first throughput, the multiplexers are configured to multiplex a given port of the ports of the first networking device to a given third networking device of the third networking devices and not to the second networking device, the second networking device uses another port of the first networking device without bridging the given port with the another port to operate the given output port at no greater than the first throughput, and the output port of the given third networking device is operational at up to the first throughput.

15. The system of claim 12, wherein the ports of the first networking device are wired Ethernet ports, the output ports of the second networking device are each a fiber channel or Ethernet port, and the output ports of the third networking devices are wired Ethernet ports.

16. A networking device comprising:
a plurality of multiplexers to directly connect to a different networking device;
a plurality of first output ports to directly connect to the different networking device and to directly connect to the multiplexers;
a plurality of second output ports to directly connect to the multiplexers and to not directly connect to the different networking device;
wherein the different networking device comprises a plurality of ports operational up to a first throughput, the first output ports operational up to a second throughput greater than the first throughput, and the second output ports operational up to a third throughput no greater than the first throughput, and wherein the multiplexers are to multiplex each port of the first networking device to which the multiplexers are connected to one of the first output ports or to one of the second output ports.

17. The networking device of claim 16, wherein in a bridging mode of a given first output port of the first output ports, the given first output port is configured to operate at greater than the first throughput, the multiplexers are configured to multiplex a given port of the ports of the different networking device to the given first output port and not to a given second output port of the second output ports, the given port and another port of the different networking device are bridged to operate the given first output port at greater than the first throughput, and the given second output port is non-operational.

18. The networking device of claim 16, wherein in a bridging mode of a given first output port of the first output ports, the given first output port is configured to operate at no greater than the first throughput, the multiplexers are configured to multiplex a given port of the ports of the different networking device to a given second output port of the second output ports and not to the given first output port, another port of the different networking device is used without being bridged with the given port to operate the given first output port at no greater than the first throughput, and the given second output port is operational at up to the first throughput.

19. The networking device of claim 16, wherein the ports of the different networking device are wired Ethernet ports, the first output ports are each a fiber channel or Ethernet port, and the second output ports are wired Ethernet ports.

20. A method performable in a system comprising a first networking device, a multiplexer, a second networking device, and a third networking device, the method comprising:

to operate an output port of the second networking device at a first throughput greater than a throughput of each of a plurality of ports of the first networking device,
multiplexing a first port of the ports of the first networking device from the first networking device to the second networking device, using the multiplexer, such that an output port of the third networking device to which the multiplexer is connected is non-operational;
bridging the first port with a second port of the ports of the first networking device directly connected to the second networking device to operate the output port of the second networking device at the first throughput;

to operate the output port of the second networking device at a second throughput no greater than the throughput of each of the plurality of ports of the first networking device,
using the second port of the first networking device directly connected to the second networking device, without bridging the second port with the first port of the first networking device, to operate the output port of the second networking device at the first throughput; and
multiplexing the first port of the first networking device from the first networking device to the third networking device, using the multiplexer, such that the output port of the third networking device to which the multiplexer is connected is operational at up to the throughput of each of the plurality of ports of the first networking device.

* * * * *